United States Patent [19]
Abe et al.

[11] Patent Number: 4,563,505
[45] Date of Patent: Jan. 7, 1986

[54] PROCESS FOR PRODUCING THERMOPLASTIC GRAFT COPOLYMER RESIN CONTAINING NITRILE

[75] Inventors: Mitsuo Abe; Seiichi Atomori, both of Yokkaichi; Tadahiko Tsutsumi, Suzuka; Masahiko Noro, Yokkaichi, all of Japan

[73] Assignee: Japan Synthetic Rubber Co., Ltd., Tokyo, Japan

[21] Appl. No.: 532,068

[22] Filed: Sep. 14, 1983

[30] Foreign Application Priority Data

Sep. 22, 1982 [JP] Japan ................................ 57-163958

[51] Int. Cl.$^4$ .................... C08F 279/02; C08F 279/04
[52] U.S. Cl. ...................................... 525/316; 525/67; 525/68; 525/86; 525/308
[58] Field of Search ....................... 525/316, 308, 290; 524/534, 535, 827

[56] References Cited

U.S. PATENT DOCUMENTS 4,112,021  9/1978  Shima et al. ........................ 525/316

FOREIGN PATENT DOCUMENTS 766801  9/1967  Canada ................................. 525/316

*Primary Examiner*—Wilbert J. Briggs, Sr.
*Attorney, Agent, or Firm*—Oblon, Fisher, Spivak, McClelland & Maier

[57] ABSTRACT

A process for producing a thermoplastic resin by polymerizing a monomer mixture consisting of an unsaturated nitrile monomer and an alkenyl aromatic hydrocarbon monomer in the presence of a rubbery polymer latex, characterized in that (a) at first, a monomer mixture having an unsaturated nitrile monomer content of 0 to 20 weight % is polymerized in an amount of 30 to 70 weight % based on the amount of the whole monomer mixture, (b) subsequently, the residual monomer mixture having an unsaturated nitrile monomer content of 35 to 90 weight % is polymerized, and the unsaturated nitrile monomer content in the polymer part formed by polymerization in said (a) and (b) steps is 28 to 38 weight %. The thermoplastic resin obtained according to this process has a high chemical resistance, an excellent impact resistance and an excellent processability.

11 Claims, No Drawings

PROCESS FOR PRODUCING THERMOPLASTIC GRAFT COPOLYMER RESIN CONTAINING NITRILE

This invention relates to a process for producing a novel thermoplastic resin. More particularly, it relates to a process for producing a novel thermoplastic resin having a high chemical resistance, an excellent impact resistance and an excellent processability.

The polymers composed of a rubbery polymer, an alkenyl aromatic compound, and an unsaturated nitrile (for example, ABS resins, etc.) have hitherto been widely used in a field such as electric goods, interior and exterior trim parts of cars, office appliances and the like, because they have excellent mechanical properties and molding processability.

Furthermore, the aforesaid polymers are widely applied in the field of fabrication where chemical resistance is required. For instance, the articles of ABS resin or the like are coated in order to impart thereto characteristics concerning appearance or to compensate for their low weather resistance in their use out of doors. The aforesaid polymers are used together with urethane foams as structural materials such as interior materials of refrigerator. In these fields, as mentioned below, various problems have recently occurred, and hence, higher chemical resistance is now required than before.

In general, ABS resins and the like are good in adhesion to paints and in affinity to thinners, and therefore, excellent in ability to be coated, so that the molded articles of ABS resins are coated with a urethane paint or an acrylic paint.

The urethane paint is superior in chemical resistance to the acrylic paint. However, in the stage where the coating film of urethane has not been solidified completely, the chemical resistance is not sufficient, for instance, when an inferior portion of a coated product is coated again, the original coating film is swollen and peeled (hereinafter referred to as lifting), and the surface of the coating film changes, and hence, the commercial value thereof is lowered.

As a countermeasure thereof, an amine catalyst is added to promote the solidification of the paint, but it causes the shortening of pot life of urethane coating and an increase of cost. Further, the coating conditions are changed, but the real state is that the selection of the conditions is narrow in width and is restricted by workability, or the like.

The ABS resins and thelike are used as interior material for the box body of a refrigerator, and a urethane foam insulator is placed between the inner box and the outer housing. In this case, the inner box comes to contact with an isocyanate compound, a polyol compound and Freon gas or the like as a foaming agent, which are the starting components for the polyurethane foam, and the resin is eroded chemically by these starting components, resulting in a great deterioration of the strength thereof.

Therefore, there is adopted a method in which a Freon gas-resistant film is provided on the surface of the inner box (on the side contacting with Freon gas) to prevent the erosion by the Freon gas. According to such a method, not only is the process for producing a box body of a refrigerator complicated, but the urethane foam also comes to be separated from the face of the box body. As a result, the structure of the box body does not become integrated and the inner box is not sufficiently fixed.

The object of this invention is to provide a thermoplastic resin which is excellent in lifting property and Freon gas-resistance (referred to hereinafter as special chemical resistance) and is also good in impact resistance and processability, by graft-copolymerizing stepwise a mixture consisting of an unsaturated nitrile compound and an alkenyl aromatic compound while varying the proportion of the unsaturated nitrile compound contained therein in the presence of a rubbery polymer latex.

According to this invention, there is provided a process for producing a thermoplastic resin by polymerizing a monomer mixture consisting of an unsaturated nitrile monomer and an alkenyl aromatic hydrocarbon monomer in the presence of a rubbery polymer latex, characterized in that (a) at first, a monomer mixture having an unsaturated nitrile monomer content of 0 to 20 weight % is polymerized in an amount of 30 to 70 weight % based on the amount of the whole monomer mixture, (b) subsequently, the residual monomer mixture having an unsaturated nitrile monomer content of 35 to 90 weight % is polymerized, and the content of the unsaturated nitrile monomer in the polymer part formed by polymerization in said (a) and (b) steps is 28 to 38 weight %.

As the rubbery polymer of the rubbery polymer latex in this invention, there may be used polybutadiene, acrylonitirile-butadiene copolymer, styrene-butadiene copolymer, isoprene rubber, chloroprene rubber, acrylic rubber, ethylene-propylene-diene rubber and the like. These may be used alone or in admixture of two or more. The latex may be produced by a usual emulsion polymerization method or re-emulsification of these polymers.

The monomers used for producing the graft polymer of this invention are an unsaturated nitrile monomer and an alkenyl aromatic hydrocarbon monomer. For example, as the unsaturated nitrile, there may be used acrylonitirle, methacrylonitrile and the like. As the alkenyl aromatic hydrocarbon monomer, there may be used styrene, α-methylstyrene, p-methylsytrene, o-methylstyrene, m-methylstyrene, chlorostyrene, bromostyrene, vinylnapthalene, an alkoxystyrene and the like. These may be used either alone or in combination of two or more. Other copolymerizable monomers, for example, methyl methacrylate and the like, may be substituted for a part of the alkenyl aromatic hydrocarbon monomer, if necessary, in such an amount that the object of this invention is not affected.

The graft polymer of this invention can be obtained according to a production process by, for example, usual emulsion polymerization. That is to say, the graft polymer of this invention is obtained by emulsion-graft-polymerizing a monomer mixture of the unsaturated nitrile monomer and the alkenyl aromatic hydrocarbon monomer in the presence of the aforesaid rubbery polymer latex.

In the process of this invention, it is preferable to emulsion-graft-polymerize 95 to 40 parts by weight, more preferably 80 to 40 parts by weight, of a monomer mixture of the unsaturated nitrile monomer and the alkenyl aromatic hydrocarbon monomer in the presence of 5 to 60 parts by weight (as solids), preferably 20 to 60 parts by weight (as solids), of the rubbery polymer latex (total amount of the rubbery polymer latex and the monomer mixture being 100 parts by weight). When the amount of the rubbery polymer is less than 5 parts by weight, the impact resistance of the thermoplastic resin of this invention is insufficient, while when the amount of the rubbery polymer exceeds 60 parts by weight, the recovery of the resin as powder becomes difficult. Therefore, such proportions are not desirable. Furthermore, no resin with an excellent physical property balance of fluidity and impact resistance can be produced in such proportions. Besides, the graft polymers obtained in such proportions are difficult to knead uniformly when they are blended with other thermoplastic resins or acrylonitrile-styrene copolymers (AS resins).

The whole monomer mixture of this invention consists suitably of 25 to 40 weight % of the unsaturated nitrile monomer and 75 to 60 weight % of the alkenyl aromatic hydrocarbon monomer. In order to enhance the impact resistance and the solvent resistance, the proportion of the unsaturated nitrile monomer is preferably 25 weight % or more. When it exceeds 40 weight %, such defects appear remarkably that the processability and the impact resistance are deteriorated and the discoloration tends to occur upon high-temperature molding.

In order to achieve the object of this invention, that is to say, in order to impact the special chemical resistance, it is important that when the graft-polymerization of the monomer mixture in the presence of the rubbery polymer latex is conducted in such a manner that in the first step, a monomer mixture having an unsaturated nitrile monomer content of 0 to 20 weight %, preferable 0 to 18 weight %, is polymerized in an amount of 30 to 70 weight %, preferably 30 to 60 weight %, based on the amount of the whole monomer mixture, and in the second and subsequent steps, the remaining monomer mixture having an unsaturated nitrile monomer content of 35 to 90 weight %, preferably 40 to 70 weight %, is polymerized.

When the unsaturated nitrile monomer content in the monomer mixture used in the first step exceeds 20 weight %, the special chemical resistance is deteriorated. When the amount of the monomer mixture used in this step is less than 30 weight % based on the amount of the whole monomer mixture, the improvement of the special chemical resistance cannot be expected. If the amount is too much, the stability of the latex during polymerization is lowered.

Then, in the second step and subsequent steps, the remaining monomer mixture is polymerized, and when the unsaturated nitrile monomer content in the monomer mixture is less than 35 weight %, the special chemical resistance is deteriorated, while when it is too high, the polymerization conversion is lowered and the fluidity is deteriorated. When the obtained graft polymer is blended with an AS resin with a high unsaturated nitrile monomer content in order to compensate for the chemical resistance, it is difficult to knead them uniformly because of low compatibility between the two.

In both the first and second steps of the graft reaction in accordance with this invention, the polymerization may be carried out in a usual manner after the addition of the monomers, initiators and the like at one time or while adding them in portions or continuously. The partition of the monomers in the case of portionwise addition is not critical so far as the unsaturated nitrile monomer content in the monomer composition falls within the scope of this invention.

When the unsaturated nitrile monomer content in the polymer part formed by polymerization in the thus obtained thermoplastic resin is 28 to 38 weight %, such physical property balance among special chemical resistance, impact resistance and processability becomes good.

As the emulsifier in this invention, any of the emulsifiers which are usually used in emulsion polymerization may be used. Among them, an alkali metal salt of a fatty acid, an alkali metal salt of an aliphatic sulfate, a disproportionated alkali metal rosinate or the like may suitable be used.

As the radical polymerization initiator used in the graft reaction, there may be used a water-soluble initiator such as potassium persulfate, ammonium persulfate or the like, an oil-soluble initiator consisting of an organic peroxide alone such as cumene hydroperoxide, benzoyl peroxide, lauroyl peroxide, paramenthane peroxide, t-butyl hydroperoxide or the like, or a redox system initiator consisting of the aforesaid organic peroxide and an iron salt such as ferrous sulfate or the like. In this case, the iron salt may contain an auxiliary reducing agent or a chelating agent as in sugar-containing pyrophosphoric acid recipe, sulfoxylate recipe or the like. Further, a polymerization regulator may be used if necessary. As the polymerization regulator, there may be used mercaptans such as n-octyl mercaptan, n-dodecyl mercaptan, t-dodecyl mercaptan, mercaptoethanol and the like, terpene mixtures consisting of dipentene, terpinolene, γ-terpinene and a small amount of other cyclic terpenes, halogen compounds and the like.

The thermoplastic resin obtained according to the process of this invention may be put alone in practice, and may also be mixed with other impact-resistant thermoplastic resins including rubber-reinforced thermoplastic resins such as ABS resin, AES resin, AAS resin and the like, whereby the performance of the product can be improved. Further, the thermoplastic resin obtained according to the process of this invention may be used in admixture with other resins such as polyphenylene ether resin, polyoxymethylene resin, polyamides, polyesters and the like. The thermoplastic resin obtained by the process of this invention is particularly excellent in compatibility with polyphenylene ether resins, and a blend composition of the two is excellent in heat resistance, impact strength, surface gloss of molded article, solvent resistance, ability to be coated. The thermoplastic resin can also be well blended with polycarbonate resin, and the resulting blend composition is excellent in ability to be coated.

Furthermore, the thermoplastic resin obtained by the process of this invention may also be put in practice in admixture with a copolymer of at least one alkenyl aromatic hydrocarbon monomer, at least one unsaturated nitrile monomer and, in some cases, at least one unsaturated ester monomer, for example, commercially available AS resin or the like.

In these cases, a thermoplastic resin with a high content of rubbery polymer of this invention is previously prepared and then blended with other resins so that the content of the rubbery polymer in the finally obtained resin composition becomes 5 to 40 weight %, whereby good results are obtained. In order to improve the special chemical resistance, processability and impact resistance of the final resin composition, it is desirable that the AS resin to be blended has such a high content of unsaturated nitrile monomer as 30 weight % or more and an intrinsic viscosity of 0.35 dl/g or more as measured in methyl ethyl ketone at 30° C.

It is also possible to mix additionally an anti-aging agent such as a hindered phenol or the like, a lubricant such as a metal salt of a fatty acid or the like and other various additives usually used for such kinds of polymers in an appropriate amount with these thermoplastic resins (or compositions).

Since the thermoplastic resin thus obtained has high special chemical resistance and is also good in impact resistance and processability, its industrial utilization value is very great in fields of materials for coating and interior trim materials for refrigerator.

This invention will more specifically be explained below referring to Examples. However, this invention is not limitted to these Examples. In each of the Examples, part and % are by weight.

EXAMPLE 1

(Production Process of Latex A)

Butadiene was subjected to emulsion polymerization using a fatty acid soap as an emulsifier, a redox system initiator composed essentially of cumene hydroperoxide and ferrous sulfate as an initiator, t-dodecyl mercaptan as a chain transfer agent, and the polymerization system was forcibly stirred on the way of polymerization, whereby a polybutadiene latex (referred to hereinafter as latex A) containing enlarged particles was prepared. The polymerization time was 60 hours and the conversion was 60%. The average gel content of the latex A was 78% and the weight fraction of the particles having a diameter of 3,100 Å or more as measured by a sodium alginate method was 60%.

(Production of Graft Polymer)

A reactor equipped with a stirrer, a heating jacket, a reflux condenser, a thermometer, an inlet for nitrogen gas and a means for continuous addition of monomer emulsion and polymerization initiators was charged with the following substances and replaced by nitrogen, after which the resulting mixture was heated and subjected to graft polymerization at 70° C. for one hour:

Latex A (as solids)—16 parts
Polybutadiene latex (as solids) (Product of Japan Synthetic Rubber Co., Ltd., JSR 0700)—24 parts
Styrene—18 parts
Acrylonitrile—2 parts
Disproportionated potassium rosinate—1.0 part
Terpinolene—0.02 part
Cumene hydroperoxide—0.10 part
Dextrose—0.35 part
Sodium pyrophosphate—0.30 part
Ferrous sulfate—0.01 part
Ion exchanged water—150 parts Subsequently, the following mixture was continuously added thereto over a period of 2 hours:

Styrene—22 parts
Acrylonitrile—18 parts
Cumene hydroperoxide—0.20 part
Terpinolene—0.20 part After the addition, the reaction was continued at 70° C. for one hour with stirring. To the resulting graft polymer latex was added 1.0 part of 2,6-di-t-butyl-p-cresol as an anti-aging agent, followed by addition of sulfuric acid (2 parts per 100 parts of the polymer) to coagulate the latex. The coagulated product was separated, washed, dehydrated and dried to obtain a graft polymer. The acrylonitrile content (measured according to Coleman analysis; hereinafter the same applies) in the polymer part formed by polymerization of the graft polymer obtained was 31%. An AS resin (the content of acrylonitrile is 30%; the intrinsic viscosity is 0.45 dl/g as measured in methyl ethyl ketone at 30° C.) was mixed therewith to adjust the amount of rubber to 24 parts, and 2 parts of ethylene bisstearylamide was added thereto. The resulting mixture was pelletized by means of an extruder at 200° C.

The fluidity in processing was measured by means of a Koka type flow tester (nozzle: $1\phi \times 2$ mm, load: 30 kg/cm$^2$).

The Izod impact strength was measured according to the method of ASTM D256 at 23° C. on a predetermined test piece molded by means of a 5-oz injection machine at 220° C.

The lifting property was measured according to the following method on a test piece of 55 mm $\times$ 80 mm $\times$ 1.6 mm molded by means of a 1-oz injection machine at 220° C. The test piece was coated with a urethane coating (Ureol No. 600, produced by Kawakami Paint) by blowing, dipped in gasoline to measure the time till the urethane coating film was swollen and peeled. It is judged that the longer the time, the better the lifting property.

The test of Freon gas resistance was carried out according to the following method on a test piece of 40 mm $\times$ 200 mm $\times$ 2 mm molded by means of a press-molding machine at 210° C. The test piece was fixed on a semicircular strain-imparting means having an outer diameter of 130 mm at 23° C. which was placed in a glass desiccator having an inner capacity of 10 liters and containing Freon R-11 (liquid) at the bottom. The desiccator was sealed, and the placed in a thermostatic chamber adjusted to 50° C. and allowed to stand for one hour. Thereafter, the desiccator was taken out of the thermostatic chamber and allowed to stand at 23° C. for 2 hours. Finally, the desiccator was placed in a thermostatic chamber adjusted to $-30$° C. and allowed to stand for 120 hours. A dumbbell as defined in ASTM D1822 was longitudinally cut out of the test piece treated under the above conditions by means of a clicker blade. The tensile impact strength was measured on this dumbbell according to the method of ASTM D1822. These physical properties are shown in Table 1.

EXAMPLE 2

Polymerization and compounding were carried out in the same manner as in Example 1, except that the amounts of styrene and acrylonitrile in the graft polymerization were changed as shown in Table 1. The composition of the graft polymer and the physical properties of the resulting resin are shown in Table 1.

COMPARATIVE EXAMPLES 1 TO 4

Polymerization and compounding were carried out in the same manner as in Example 1, except that the amounts of styrene and acrylonitrile in the graft polymerization were changed as shown in Table 1. The compositions of the graft polymers and the physical properties of the resulting resins are shown in Table 1.

Comparative Example 1 is a case in which the acrylonitrile content of the polymer part formed by polymerization in the first and second steps is beyond the scope of this invention, Comparative Example 2 is a case in which the amount of the monomers polymerized in the first step is beyond the scope of this invention and Comparative Examples 3 and 4 are cases in which the acrylonitrile content of the polymer part formed by polymerization in the graft polymer obtained is beyond the scope of this invention.

It is found from the results shown in Table 1 that if the acrylonitrile content of the charged monomer mixture in the graft polymerization is beyond the scope of this invention as in Comparative Example 1 or the amount of the charged monomer mixture is beyond the scope of this invention as in Comparative Example 2, the lifting property and Freon gas resistance are adversely affected.

It is also found that if the acrylonitrile content of the polymer part formed by polymerization in the graft polymer is too high as in Comparative Example 3, the fluidity is deteriorated, while if it is too low as in Comparative Examples 4, the coating film is not satisfactory, and hence, such acrylonitrile contents are not desirable.

EXAMPLE 3

The same reactor as in Example 1 was charged with the following substances and replaced by nitrogen, and the resulting mixture was heated and subjected to graft polymerization at 70° C. for one hour:
  Latex A (as solids)—9.6 parts
  Polybutadiene latex (as solids) (Product of Japan Synthetic Rubber Co., Ltd., JSR 0700)—14.4 parts
  Styrene—22 parts
  Acrylonitrile—4 parts
  Disproportionated potassium rosinate—1.5 parts
  t-Dodecyl mercaptan—0.03 part
  Cumene hydroperoxide—0.10 part
  Dextrose—0.35 part
  Sodium pyrophosphate—0.30 part
  Ferrous sulfate—0.01 part
  Ion exchanged water—150 parts Further, the following mixture was continously added thereto over a period of 2 hours:
  Styrene—28 parts
  Acrylonitrile—22 parts
  Cumene hydroperoxide—0.18 parts
  t-Dodecyl mercaptan—0.25 part After the addition, the reaction was further continued at 70° C. for one hour with stirring. To the resulting graft polymer latex was added 1.0 part of 2,6-di-t-butyl-p-cresol as an anti-aging agent. Thereafter, the same treatment as in Example 1 was carried out to obtain a graft polymer. The acrylonitrile content of the polymer part formed by polymerization in this graft polymer was 31%. To this graft polymer was added 2 parts of ethylene bisstearylamide. The resulting mixture was pelletized by means of an extruder at 200° C. and physical properties thereof were measured. The results obtained are shown in Table 2.

COMPARATIVE EXAMPLE 5

Polymerizaion was carried out in the same manne as in Example 3, except that the amounts of styrene and acrylonitrile in the graft polymerization were changed as shown in Table 2, where the acrylonitrile content in the monomer mixture charged in the first step polymerization was 34.6% which is beyond the scope of this invention. The composition of the monomers and the physical properties of the obtained resin are shown in Table 2.

EXAMPLE 4

The first step of graft polymerization was carried out in the same manner as in Example 3, and thereafter, mixtures (a) and (b) were continuously added in this order over a period of one hour.
Mixture (a):
  Styrene—15 parts
  Acrylonitrile—10 parts
  Cumene hydroperoxide—0.09 part
  t-Dodecyl mercaptan—0.10 part
Mixture (b):
  Styrene—13 parts
  Acrylonitrile—12 parts
  Cumene hydroperoxide—0.09 part
  t-Dodecyl mercaptan—0.15 part After the addition, the reaction was further continued at 70° C. for one hour. The other procedure and conditions were the same as in Example 3. The physical properties of the resin obtained are shown in Table 2.

EXAMPLE 5

The first step of graft polymerization was carried out in the same manner as in Example 3, and thereafter, the following mixture was continuously added over a period of two hours:
  Styrene—23 parts
  Acrylonitrile—22 parts
  Cumene hydroperoxide—0.18 part
  t-Dodecyl mercaptan—0.25 part Then, the following mixture was added and the reaction was further continued at 70° C. for one hour with stirring:
  Styrene—5 parts
  Cumene hydroperoxide—0.05 part The other procedure and conditions were the same as in Example 3. The physical properties of the resin obtained are shown in Table 2. As seen in this Example, the partition method of styrene and acrylonitrile in the polymerization of the second and subsequent steps is not critical so far as the acrylonitrile content of the monomer composition is within the scope of this invention.

EXAMPLE 6

The same procedure as in Example 3 was repeated, except that p-methylstyrene was substituted for the whole amount of styrene used in Example 3. The physical properties are shown in Table 2.

EXAMPLE 7

The same procedure as in Example 3 was repeated, except that vinyltoluene (a mixture of ortho-, meta- and para-) was substituted for the whole amount of styrene used in Example 3. The physical properties are shown in Table 2.

EXAMPLE 8

The same reactor as in Example 1 was charged with the following substances and replaced by nitrogen, and the resulting mixture was heated and subjected to graft polymerization at 70° C. for one hour.
  Latex A (as solids)—16 parts
  Polybutadiene latex (as solids) (Product of Japan Synthetic Rubber Co., Ltd., JSR 0700)—24 parts
  Styrene—25.5 parts
  Acrylonitrile—4.5 parts
  Disporportionated potassium rosinate—1.0 part Terpinolene—0.03 part
Cumene hydroperoxide—0.15 part
Dextrose—0.35 part
Sodium pyrophosphate—0.30 part
Ferrous sulfate—0.01 part
Ion exchanged water—150 parts Further, the following mixture was continuously added thereto over a period of 2 hours:
Styrene—15 parts
Acrylonitrile—15 parts
Cumene hydroperoxide—0.15 part
Terpinolene—0.15 part After the addition, the reaction was further continued at 70° C. for one hour with stirring. The resulting graft polymer latex was treated in the same manner as in Example 1 to obtain a graft polymer. The acrylonitrile content of the polymer part formed by polymerization in this graft polymer was 30%.

The graft polymer was blended with the same AS resin as in Example 1 in such a proportion that the amount of the rubbery polymer became 24% based on the weight of the blend. The physical properties of the blend were measured to obtain the results shown in Table 2.

TABLE 1

|  | Example 1 | Example 2 | Comparative Example 1 | Comparative Example 2 | Comparative Example 3 | Comparative Example 4 |
|---|---|---|---|---|---|---|
| Amount of rubber latex (as solids) (parts) | 40 | 40 | 40 | 40 | 40 | 40 |
| Total amount of styrene (parts) | 40 | 40 | 40 | 40 | 33 | 45 |
| Total amount of acrylonitrile (parts) | 20 | 20 | 20 | 20 | 27 | 15 |
| [First step polymerization] | | | | | | |
| Amount of styrene (parts) | 18 | 20 | 13.3 | 9 | 17 | 20 |
| Amount of acrylonitrile (parts) | 2 | 0 | 6.7 | 1 | 3 | 0 |
| Acrylonitrile content in charged monomer mixture (%) | 10 | 0 | 33.5 | 10 | 15 | 0 |
| [Second step polymerization] | | | | | | |
| Amount of styrene (parts) | 22 | 20 | 26.7 | 31 | 16 | 25 |
| Amount of acrylonitrile (parts) | 18 | 20 | 13.3 | 19 | 24 | 15 |
| Acrylonitrile content in charged monomer mixture (%) | 45 | 50 | 33.3 | 38 | 60 | 38 |
| Acrylonitrile content of polymer part formed by polymerization (%) | 31 | 30 | 31 | 31 | 40 | 23 |
| Physical properties | Methods for measuring physical properties were those shown in Example 1. Evaluated resin was a blend of the graft polymer and AS resin shown in Example 1 in such a proportion that the amount of rubber became 24% based on the weight of the blend. | | | | | |
| Izod impact strength, notched; (Kg · cm/cm) | 35 | 37 | 29 | 40 | 30 | 20 |
| Fluidity ($\times 10^{-3}$ cm$^3$/sec) | 17 | 16 | 13 | 14 | 8 | 25 |
| Lifting property (time taken for coating film to be swollen and peeled) (minutes) | 180 | 190 | 90 | 100 | 170 | Coating film was not satisfactory |
| Freon gas resistance Tensile impact strength (Kg · cm/cm$^2$) | | | | | | |
| Before treatment | 65 | 70 | 60 | 70 | 60 | 45 |
| After treatment | 45 | 50 | 10 | 20 | 40 | 20 |

TABLE 2

|  | Example 3 | Comparative Example 5 | Example 4 | | Example 5 | | Example 6 | Example 7 | Example 8 |
|---|---|---|---|---|---|---|---|---|---|
| Amount of rubber latex (as solids) (parts) | 24 | 24 | 24 | | 24 | | 24 | 24 | 40 |
| Total amount of styrene (parts) | 50 | 50 | 50 | | 50 | | 50*1 | 50*2 | 40.5 |
| Total amount of acrylonitrile (parts) | 26 | 26 | 26 | | 26 | | 26 | 26 | 19.5 |
| [First step polymerization] | | | | | | | | | |
| Amount of styrene (parts) | 22 | 17 | 22 | | 22 | | 22*1 | 22*2 | 25.5 |
| Amount of acrylonitrile (parts) | 4 | 9 | 4 | | 4 | | 4 | 4 | 4.5 |
| Acrylonitrile content in charged monomer mixture (%) | 15.4 | 34.6 | 15.4 | | 15.4 | | 15.4 | 15.4 | 15 |
| [Second step polymerization] | | | (Second step) | (Third step) | (Second step) | (Third step) | | | |
| Amount of styrene | 28 | 33 | 15 | 13 | 23 | 5 | 28*1 | 28*2 | 15 |

TABLE 2-continued

| | Example 3 | Comparative Example 5 | Example 4 | | Example 5 | | Example 6 | Example 7 | Example 8 |
|---|---|---|---|---|---|---|---|---|---|
| (parts) Amount of acrylonitrile | 22 | 17 | 10 | 12 | 22 | 0 | 22 | 22 | 15 |
| (parts) Acrylonitrile content in charged monomer mixture (%) | 44 | 34 | 40 | 48 | 48.9 | 0 | 44 | 44 | 50 |
| Acrylonitrile content of polymer part formed by polymerization (%) | 31 | 31 | 31 | | 31 | | 31 | 31 | 30 |
| Physical properties | | Methods for measuring physical properties were those shown in Example 1. Resin evaluated was graft polymer itself. | | | | | | | *3 |
| Izod impact strength, notched (Kg · cm/cm) | 33 | 28 | 35 | | 32 | | 32 | 31 | 33 |
| Fluidity ($\times 10^{-3}$ cm$^3$/sec) | 15 | 10 | 13 | | 17 | | 16 | 15 | 15 |
| Lifting property (time taken for coating film to be swollen and peeled) (minutes) | 170 | 80 | 175 | | 165 | | 178 | 181 | 170 |
| Freon gas resistance Tensile impact strength (Kg · cm/cm$^2$) | | | | | | | | | |
| Before treatment | 60 | 55 | 65 | | 60 | | 60 | 62 | 65 |
| After treatment | 45 | 15 | 45 | | 45 | | 45 | 46 | 40 |

Note:
*¹p-methylstyrene
*²vinyltoluene
*³Resin evaluated was the blend.

EXAMPLES 9 AND 10 AND COMPARATIVE EXAMPLE 6

(Blend with polyphenylene ether resin)

The thermoplastic resin obtained in Example 1 or 2 or Comparative Example 1 was blended with an AS resin and a polyphenylene ether resin obtained by the following method, and properties of the blend thus obtained were measured to obtain the results shown in Table 3:

(Production of polyphenylene ether resin)

A stainless steel reactor was purged well by nitrogen, and 53.6 g of cupric bromide and 1,110 g of di-n-butylamine were added to the reactor, after which a solution of 8.75 kg of 2,6-xylenol in 40 liters of toluene was added thereto. The resulting mixture was stirred to form a uniform solution, and polymerization was conducted at 30° C. for 2 hours while blowing oxygen into the reactor at a high rate. After the termination of the polymerization, ethanol was gradually added while vigorously stirring the polymer solution phase to form a slurry, which was then filtered and dried to obtain a polymer (PPE).

Evaluation Methods (1) Impact strength: According to ASTM D256, a sample having a thickness of ¼ inch (notched) was subjected to measurement of impact strength.

(2) Heat deformation temperature: Molded article was annealed at 110° C. for 2 hours, and a sample having a thickness of ¼ inch was obtained therefrom and subjected to measurement of heat deformation temperature at a pressure of 264 psi according to ASTM D648.

(3) Surface gloss of molded article: The surface gloss of a molded article was evaluated visually based on the following evaluation ratings:

⊚ : Very good,
o: Good,
Δ: Slightly inferior,
x: Bad (4) Appearance of coating: Crack, craze, suction state and appearance of the surface of coating were visually evaluated after coating based on the following evaluation ratings:

⊚ : Very good,
o: Good,
Δ: Slightly inferior,
x: Bad

TABLE 3

| | Blending ratio (part) | | | | Evaluation results | | | | | |
|---|---|---|---|---|---|---|---|---|---|---|
| | | Thermoplastic resin | | Styrene resin | Rubber amount | Impact strength | Heat deformation tem- | Surface gloss of molded | Solvent resistance | | Appearance of |
| Example No. | PPE | Kind | Amount | AS resin* | (%) | (kg · cm/cm) | perature (°C.) | article | Appearance | Swelling (%) | coating |
| 9 | 40 | Ex. 1 | 45 | 15 | 18 | 32 | 136 | ⊚ | ⊚ | 5 | ⊚ |
| 10 | 40 | Ex. 2 | 45 | 15 | 18 | 30 | 136 | ⊚ | ⊚ | 5 | ⊚ |
| Comp. Ex. 6 | 40 | Comp. Ex. 1 | 45 | 15 | 18 | 6 | 93 | x | x | 7 | x |

Note:
*AS resin: acrylonitrile styrene copolymer having an acrylonitrile content of 31% by weight.

(5) Solvent resistance: The same sample as for measurement of heat deformation temperature was immersed in gasoline for 5 hours, and thereafter cracks formed and swelling degree were measured. The cracks formed were visually evaluated based on the following evaluation ratings by observing appearance:

⊚ : Very good,
o: Good,
Δ: Slightly bad,
x: Bad $$\text{Swelling degree (\%)} = \frac{\text{(Weight after immersion for 5 hours)} - \text{(Weight before immersion)}}{\text{Weight before immersion}} \times 100$$

EXAMPLES 11 TO 15 AND COMPARATIVE EXAMPLE 7

The thermoplastic resin obtained in Example 1, an AS resin having an acrylonitrile content of 32% and a polycarbonate resin (FN 2200 produced by Idemitsu Petrochemical Co., Ltd.) were mixed in proportions shown in Table 4 to obtain compositions, and physical properties of the compositions were measured to obtain the resutls shown in Table 4.

TABLE 4

|  | Example | | | | | Comparative |
|---|---|---|---|---|---|---|
|  | 11 | 12 | 13 | 14 | 15 | Example 7 |
| Amount of graft polymer of Example 1 (part) | 30 | 30 | 30 | 30 | 30 | 0 |
| Amount of AS resin (part) | 40 | 30 | 20 | 10 | 0 | 0 |
| Amount of polycarbonate resin (part) | 30 | 40 | 50 | 60 | 70 | 100 |
| Izod impact strength (kg · cm/cm) | 19 | 28 | 50 | 58 | 63 | 15 |
| Fluidity ($\times 10^{-3}$ cm$^3$/sec) | 52 | 40 | 33 | 20 | 15 | 2 |
| Heat deformation temperature (°C.) | 100 | 103 | 106 | 110 | 118 | 134 |
| Lifting property (time taken for sample to be swollen and peeled) (minutes) | 120 | 100 | 110 | 100 | 70 | 5 |
| Appearance of coating* | O | O | O | O | o | x |

Note:
*Same as in item (4) in the Evaluation methods for Table 3.

What is claimed is:

1. A process for producing a thermoplastic resin having an unsaturated nitrile monomer content of from 28–38% by weight by polymerizing a monomer component comprising an alkenyl aromatic hydrocarbon monomer in the presence of a latex of a rubbery polymer selective from the group consisting of polybutadiene, acrylonitrile-butadiene copolymer, styrene-butadiene copolymer, isoprene rubber, chloroprene rubber, acrylic rubber, and ethylenepropylene-diene rubber, comprising the steps of:
   (a) polymerizing from 30–70 wt.% of said monomer component comprising said alkenylaromatic hydrocarbon monomer and from 0–18% by weight, based on the total monomer content of said component in step (a), of an unsaturated nitrile monomer, in the presence of said rubbery polymer; and
   (b) subsequently polymerizing the remaining amount of said monomer component comprising said alkenyl aromatic hydrocarbon monomer and from 35–90% by weight, based on the total monomer content of said component in step (b), of an unsaturated nitrile monomer, in the presence of the polymerization reaction product of step (a).

2. The process according to claim 1, wherein the rubbery polymer is polybutadiene, styrene-butadiene copolymer or a mixture thereof.

3. The process according to claim 1, the unsaturated nitrile monomer is acrylonitrile or methacrylonitrile.

4. The process according to claim 1, wherein the alkenyl aromatic hydrocarbon monomer is styrene, α-methylstyrene, p-methylstyrene, m-methylstyrene, o-methylstyrene, chlorostyrene, bromostyrene, vinylnapthalene or an alkoxystyrene.

5. The process according to claim 1, wherein the monomer component is polymerized by an emulsion polymerization process.

6. The process according to claim 1, wherein the amount of the total monomer component in steps (a) and (b) is 95 to 40 parts by weight per 5 to 60 parts by weight of the rubbery polymer latex (as solids).

7. The process according to claim 1, wherein the amount of the total monomer component in steps (a) and (b) is 80 to 40 parts by weight per 20 to 60 parts by weight of the rubbery polymer latex (as solids).

8. The process according to claim 1, wherein the total monomer component of steps (a) and (b) consists of 25 to 40 weight % of the unsaturated nitrile monomer and 75 to 60 weight % of the alkenyl aromatic hydrocarbon monomer.

9. The process according to claim 1, wherein in step (b) the remaining monomer component contains 40 to 70 weight % of the unsaturated nitrile monomer.

10. The process according to claim 1, wherein from 30 to 60 wt % of the monomer component polymerized in steps (a) and (b) is polymerized in step (a).

11. A thermoplastic resin produced according to the process of claim 1.

* * * * *